United States Patent
Lent

[15] 3,682,291
[45] Aug. 8, 1972

[54] METHOD AND APPARATUS FOR HANDLING ARTICLES

[72] Inventor: Ralph C. Lent, Lafeyette, Calif.
[73] Assignee: Del Monte Corporation, San Francisco, Calif.
[22] Filed: Feb. 2, 1970
[21] Appl. No.: 7,615

[52] U.S. Cl. ............... 198/30, 198/31 R, 198/33 AD
[51] Int. Cl. ............................................. B65g 47/26
[58] Field of Search ....... 198/30, 31 R, 59, 61, 220 B, 198/33 AA, 29, 218, 81, 78; 193/14

[56] References Cited

UNITED STATES PATENTS

| | | | |
|---|---|---|---|
| 3,179,230 | 4/1965 | Brown | 198/30 |
| 3,002,617 | 10/1961 | Fraenkel | 198/220 X |
| 2,966,250 | 12/1960 | Roboch | 198/30 |

*Primary Examiner*—Richard E. Aegerter
*Assistant Examiner*—Douglas D. Watts
*Attorney*—Flehr, Hohbach, Test, Albritton & Herbert

[57] ABSTRACT

A method and apparatus for handling elongated agricultural articles (e.g. asparagus tips) and particularly for feeding such articles in single file in a plurality of lanes. The article feeding apparatus incorporates a V-shaped trough feeding a plurality of V-shaped lanes down an incline for controlled feeding of multiple lanes of the orientor devices.

9 Claims, 8 Drawing Figures

PATENTED AUG 8 1972 3,682,291
SHEET 1 OF 3
FIG_1
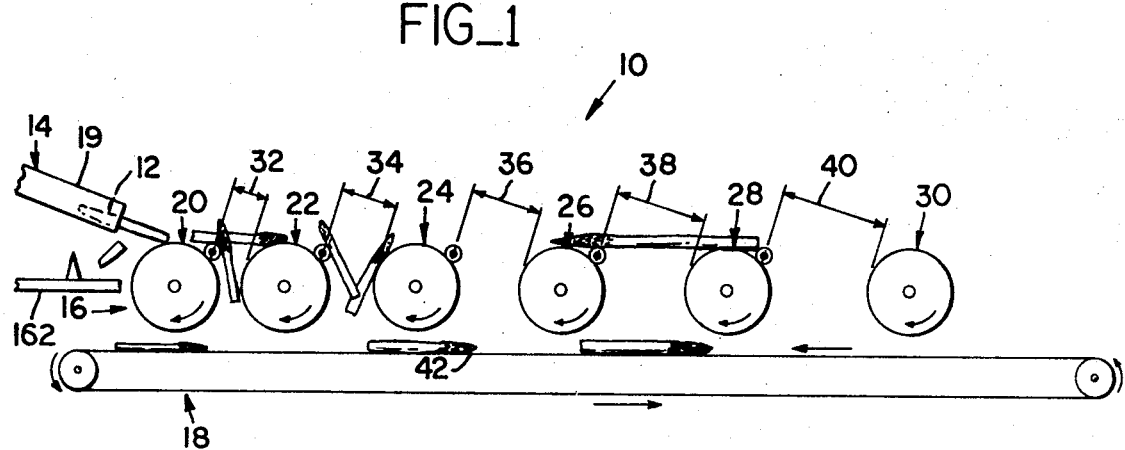
FIG_2
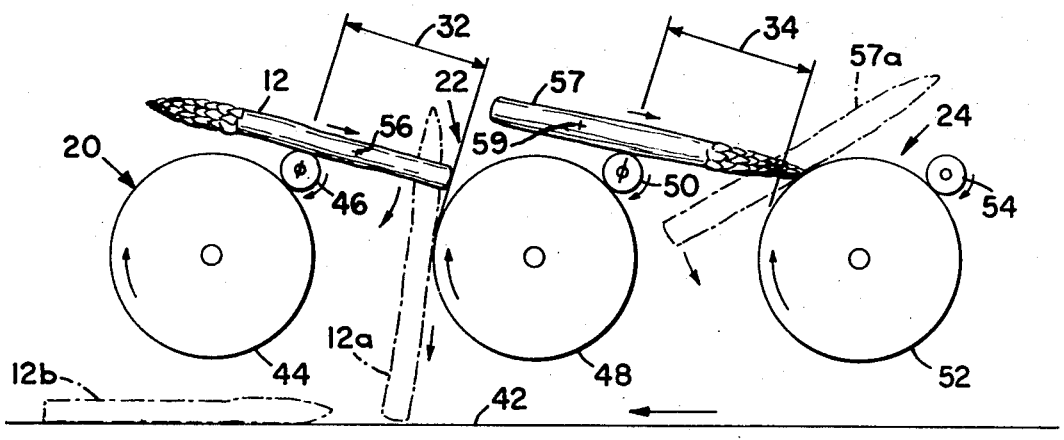
INVENTOR.
RALPH C. LENT
BY
Flehr, Hohbach, Test,
Albritton & Herbert
ATTORNEYS

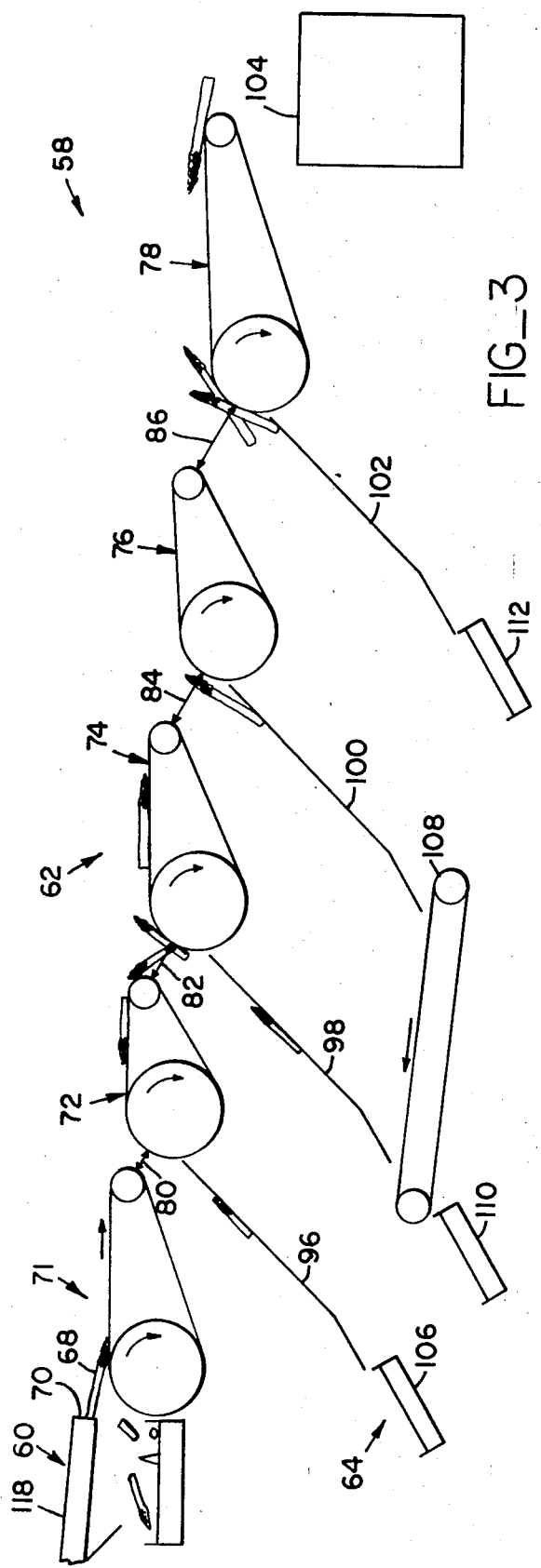
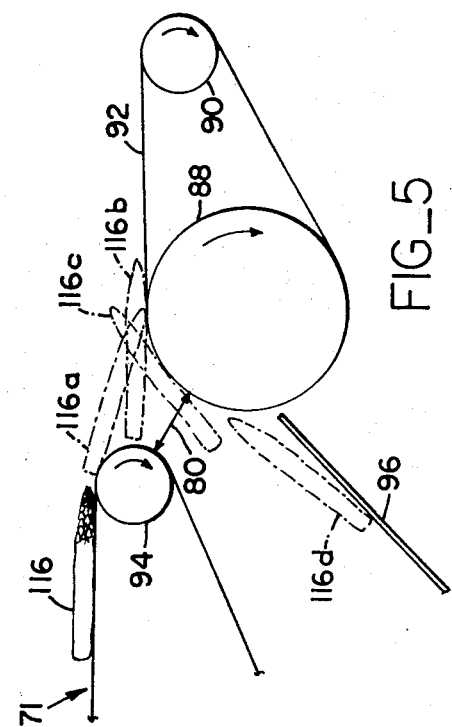
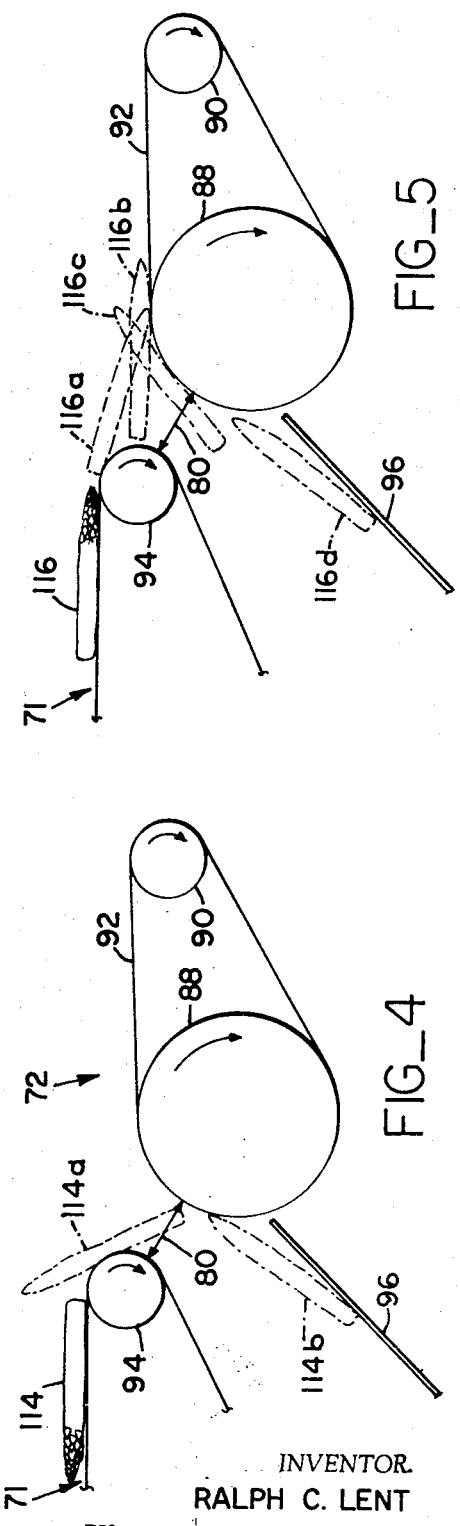

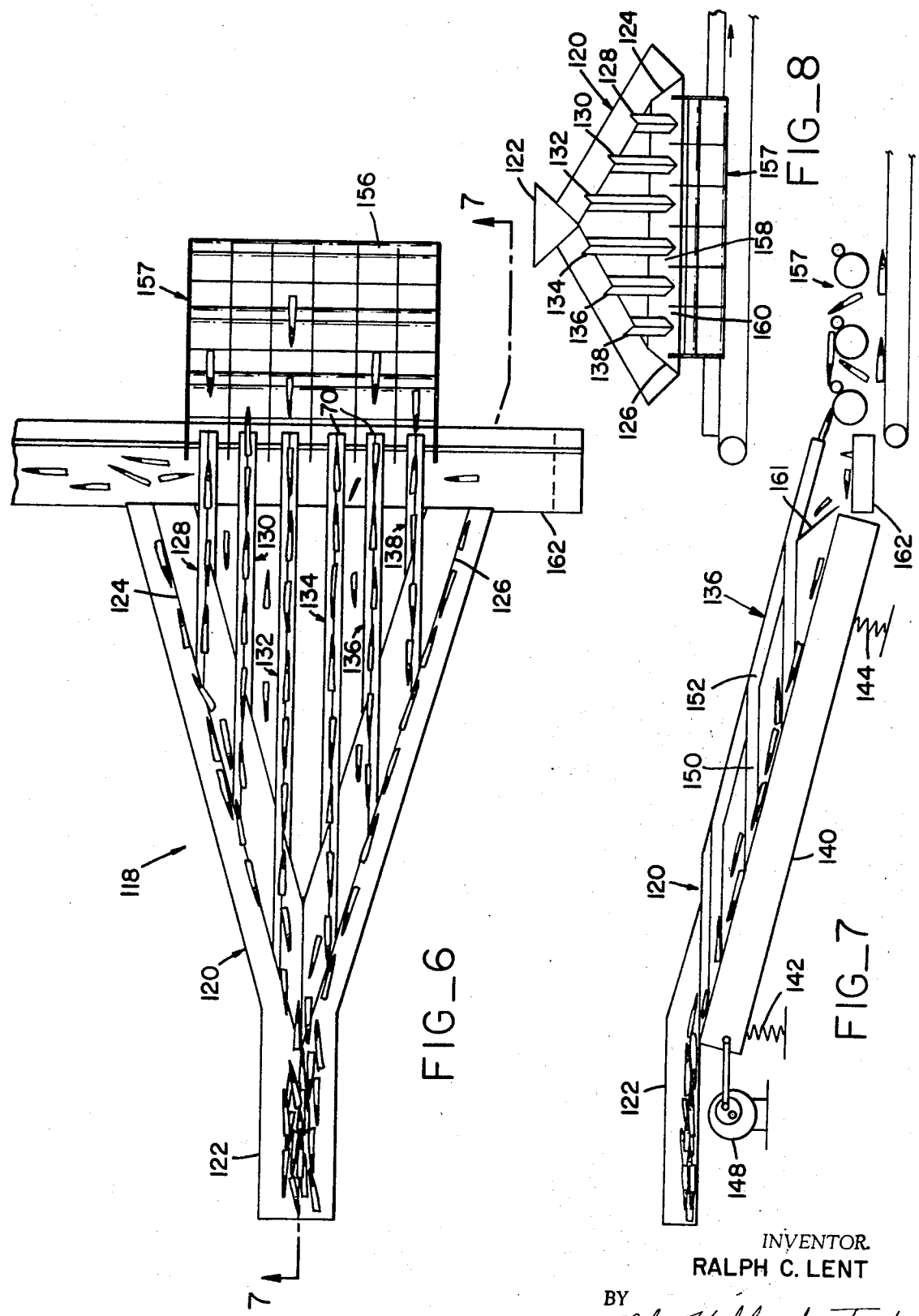

METHOD AND APPARATUS FOR HANDLING ARTICLES

BACKGROUND OF THE INVENTION

This invention relates generally to methods and apparatus for handling elongated articles like asparagus tips. More particularly the invention relates to methods and apparatus for feeding such articles in a plurality of single file lanes.

In conventional processing methods and apparatus handling articles of the type described it is desirable to provide common orientation of the articles for certain operations. THus, field asparagus spears are aligned in common lengthwise orientation for operations such as cutting or trimming and filling cans. An effective method and apparatus for this purpose is shown and claimed in copending application SER. No. 150,442. For proper operation such apparatus requires feed means which will supply the articles single file in a plurality of parallel lanes. Prior conventional feed devices have not been adequate for this purpose.

SUMMARY OF THE INVENTION AND OBJECTS

It is an object of the invention to provide an improved method and apparatus for feeding elongated articles in a plurality of lanes in single file, having reference particularly to feeding such articles to orienting apparatus.

Another object is to provide a method and apparatus of the type described in which elongated articles are distributed in single file order to a plurality of parallel lanes by a cascading action.

Another object is to provide a method and apparatus of the type described in which the articles are cascaded between V-shaped troughs for distribution in single file order into a plurality of juxtaposed lanes, and with means provided to collect overflow from the lanes so that all lanes are properly filled in single file order.

The invention employs a a V-shaped through feeding, by cascading of the articles, a series of parallel V-shaped lanes, with provision for article overflow between the lanes so that optimum distribution and singulation is provided for all lanes.

BRIEF DESCRIPTION OF THE DRAWINGS

FIG. 1 is a schematic elevational view of an article orienting apparatus such as shown in copending application Ser. No. 150,442;

FIG. 2 is an enlarged partial elevational view of the apparatus of fIG. 1, illustrating operation thereof;

FIG. 3 is a schematic elevational view of a modified form of the invention;

FIG. 4 is an enlarged partial elevational view of the invention of FIG. 3 illustrating one stage in the operation thereof;

FIG. 5 is a view similar to FIG. 4 illustrating a further operating stage of the modified form;

FIG. 6 is a top plan view of an article feeding apparatus incorporating the invention;

FIG. 7 is a side elevational view taken along the line 7—7 of FIG. 6; and,

FIG. 8 is an end elevational view of the apparatus of FIG. 6.

DESCRIPTION OF THE PREFERRED EMBODIMENTS

Referring now to the drawings and particularly FIG. 1, an article orienting apparatus is illustrated schematically at 10. While orienting apparatus 10 will be explained in relation to handling elongated agricultural products, such as the exemplary asparagus spears 12, it is understood that it has application in handling other elongated products or articles in which the center of gravity is displaced from the geometric center in a direction away from the lighter and toward the heavier end thereof, such as husked corn, carrots, and the like.

Apparatus 10 comprises an in-feed stage 14, orienting stage 16, and discharge stage 18. In-feed stage 14 is shown as including downwardly inclined V-shaped troughs 19 positioned to feed a plurality of randomly lengthwise oriented spears 12 of disparate lengths by the complete mechanism as illustrated in FIGS. 6—8. The spears are delivered to orienting stage 16 in the direction of their length along a relatively narrow lane in single file order. Suitable guideway means, not shown, may be provided to constrain the articles for movement along the lane. While the operation of apparatus 10 will be described in relation to a schematic single-laned flow path it is understood that the invention preferably employs multiple side-by-side lanes for increased efficiency.

Orientor stage 16 comprises a series of paired large and small roller units 20,22,24,26,28,30. The roller units are transversely mounted on a suitable frame, not shown, as a continuation of each lane of the feed unit 14 The roller units are spaced apart along the path of article movement to define a series of gaps 32,34,36,38,40 of progressively increasing gap length to handle a full range of article length. Suitable driving means, not shown, are provided to turn all rollers for conjoint clockwise rotation, as viewed in FIG. 1, to move the articles along the laned paths for both lengthwise orientation and length grading.

The commonly oriented articles are deposited below on discharge stage 18, shown as endless conveyor 42, powered by suitable means to convey the articles to the left for further processing. The exemplary asparagus spears are delivered by conveyor 42 for discharge onto a suitable cross-conveyor, not shown, for any subsequent trimming and canning operation. While a single discharge conveyor 42 is illustrated as receiving the oriented articles from the roller units, it is understood that the discharge stage could also comprise a plurality of separate conveyors, not shown, disposed below one or more gaps to receive the respective articles and to convey the same segregated from the remaining articles. As such, apparatus 10 would thus be adapted to orient and also segregate as to length. Thus, one conveyor unit could be disposed below gap 32 to receive all short spears, a second conveyor unit could be disposed below gaps 34,36 & 38 to receive all medium length spears, and a third conveyor unit could be disposed below gap 40 to receive all long or oversized spears.

Referring to FIG. 2, details of the construction and operation of component roller units and gaps are illustrated. The first roller unit 20 comprises a relatively large diameter roller 44 axised transversely of the path of article movement, and a relatively small diameter roller 46 axised parallel with roller 44 and positioned downstream thereof with the upper surfaces of both rollers aligned substantially horizontally. Similarly, roller unit 22 comprises paired large roller 48 and small roller 50, while roller unit 24 comprises paired large roller 52 and small roller 54. The rollers are preferably provided with a friction surface for moving the spears, and are powered by suitable means, not shown, to turn in conjoint rotation clockwise as viewed in FIG. 2 for advancing spears 12 to the right. The smaller rollers provide a precise fulcrum point for forward tilting of the spears at the proper gap, while the larger rollers provide backward tilting and allow for a greater tolerance of spear curvature, as would exist with green asparagus. In one embodiment the ratio of larger to smaller roller diameters is 6:1, although this may be varied as, for example, by using a smaller ratio for handling articles with less curvature.

Roller units 20,22 are spaced apart along the path of article movement to define a gap 32 providing a predetermined gap length effective to drop out the shortest length spears received from the in-feed stage. Roller units 22 and 24 are spaced apart to define gap 34 of increased gap length suitable to drop out and orient those spears of the next larger length increment. The remaining gaps 36–40 are successively increased for progressively dropping out and orienting spears of increasing lengths.

The articles or spears of a given length and having either butt-first, i.e., heavier end foremost, or tip-first, i.e., lighter end foremost, lengthwise orientation are oriented through a respective gap 32–40 corresponding to spear length by either forward or backward tilting by gravital action. All spears tilting through the gaps drop downwardly in butt-first orientation where they fall onto the upper reach of conveyor belt 42. Belt 42 collects the oriented spears in common in butt-first orientation, and directs them to the left as viewed in FIG. 2. The upper reach of belt 42 thus moves in the same direction as the lower margin of each large diameter roller 44,48 thereby minimizing the possibility of any obstruction of the articles between the belt and the rollers.

In operation, of the orienting apparatus orientation of the exemplary butt-first oriented spear 12 will be explained in relation to gap 32, as illustrated in FIG. 2. This gap orients the shorter spears having a length from the butt end to the center of gravity 56 sufficiently short to tilt downwardly and clear the gap. These spears of butt-first orientation are first propelled over the gap by the rollers, and when center of gravity 56 clears small roller 46 the spears tilt by gravital action with the small roller acting as a fulcrum. The center of gravity to butt end length of this short spear permits it to clear the leading edge of roller 48 and drop butt-first to the position at 12a. Conveyor 42 picks up the spear and moves it to the left in butt-first orientation to the position 12b. The longer butt-first spears will continue over the succeeding roller pairs until they drop through a sufficiently large gap.

The operation of orientor 10 in handling those spears of tip-first orientation is illustrated in FIG. 2 in relation to gap 34. An exemplary tip-first spear 57 is illustrated as having a center of gravity 59 to butt end length sufficient to permit it to bridge and clear gap 32 so that roller unit 22 is effective to drive it over gap 34. The center of gravity to tip end length of this spear first bridges the gap as the tip contacts the leading edge of next roller 52, preventing it from falling tip-first through the gap. Both roller units 22 and 24 combine to further drive the spear until its butt end clears small roller 50. The center of gravity to butt end length of this spear is short in relation to gap length 34 so that the spear will tilt backwards by gravital action to the position at 57a. The spear will continue to drop through the gap in butt-first orientation and fall onto conveyor 42 for movement to the left together with other butt-first oriented spears.

As the spears move in either butt-first or tip-first orientation across the rollers and fulcrum points about which the spears pivot will continuously change. Thus, for a butt-first oriented spear 12 the fulcrum point defined by small roller 46 continuously increases from center of gravity 56 as the spear advances across the gap. For tip-first oriented spear 57 the fulcrum determined by large roller 52 tends to decrease from the spear's center of gravity as the spear advances.

Referring to the embodiment of FIG. 3 the orienting apparatus illustrated generally at 58 employs a series of tandem conveyor belts for the orienting and grading operations. Apparatus 58 includes orientor stage 62 and discharge stage 64.

A feeder 60 schematically represents the apparatus of FIGS. 6–8 and serves to deliver the articles in a plurality of lanes and in single file to the belt conveyor 71.

Orientor stage 62 comprises a series of tandem conveyors 71,72,74,76,78 spaced apart along the direction of article movement to define a series of gaps 80,82,84,86 of progressively increasing gap length for grading and orienting a full range of article lengths. The gaps both orient and grade those spears having a center of gravity to butt end length corresponding to respective gap lengths by forward tilting of butt-first spears and backward tilting of tip-first spears. THe conveyor arrangement of orientor 62 results in the gap opening or length being less critical to spear length for an orienting operation so that fewer gaps are needed to maintain a high orienting efficiency as compared to a vibrating type orientor, for example.

Each conveyor 71–78 comprises an endless belt trained between a large diameter lead pulley and relatively small diameter trailing pulley. In FIG. 4 exemplary conveyor 72 is shown as including large diameter lead pulley 88 and small diameter trailing pulley 90 supporting endless belt 92. THe smaller pulleys provide a precise fulcrum for forward tilting, while the larger lead pulleys allow for a greater tolerance of curved spears for backward tilting. Suitable driving means, not shown, are provided to turn all pulleys clockwise as viewed in FIG. 3 for moving spears 68 to the right across successive gaps, with the spears dropping out in butt-first orientation as they reach the gaps.

The first gap 80 is defined by the relatively small diameter trailing pulley 94 of conveyor 71 and lead pulley 88 of conveyor 72. The remaining gaps are defined between respective trailing and lead pulleys of the conveyors.

Discharge stage 64 comprises a series of collector chutes to receive and distribute medium spears dropping through the orienting gaps. A downwardly inclined collector chute 96 is provided below gap 80, chute 98 is provided below gap 82, chute 100 is provided below gap 84, and chute 102 is provided below gap 86. An overlength bin 104 or suitable conveyor, not shown, may be provided at the discharge end of conveyor belt 78 to receive all overlength spears not graded and oriented in the preceding gaps. The spears advance down to the chutes in butt-first orientation and are either collected together or segregated as to length for subsequent processing. A cross-transfer conveyor 106, preferably of the endless belt type, may be provided at the discharge end of chute 96 to receive the shortest spears graded out and separately convey them to a cutting or trimming operation. The spears of medium length graded through gaps 82 and 84 may be collected together and segregated from the other spears by suitable means such as a collector conveyor 108 disposed below the discharge ends of chutes 98 and 100. Conveyor 108 in turn discharges onto a cross transfer endless conveyor 110 for delivering the medium length spears to a subsequent operation. A cross transfer endless conveyor 112 is provided below the discharge end of chute 102 to receive the long spears graded through gap 86 for delivery to the subsequent operation. It is also contemplated that one or more collector conveyors may be provided for collecting together spears from any number of the chutes, or the graded spears from each chute can be segregated from each other for separate processing, as desired.

Operation of orientor 58 in handling an exemplary butt-first oriented spear 114 of the shorter length is illustrated in FIG. 4, and the operation in handling an exemplary tip-first oriented spears 116 of the same length is illustrated in FIG. 5. Those longer spears of either orientation will continue on the conveyors until graded and separated in the succeeding gaps in a similar manner.

As but-first spear 114 advances along conveyor 71 it will begin to tilt by gravital action as its center of gravity clears the top of roller 94. Since the center of gravity to butt end length of this spear is less than gap length 80 it will drop clear of large diameter roller 88, as shown at position 114a. The spear will continue to drop onto chute 96 in the position 114b and slide down this chute onto the transfer conveyor. Those butt-first oriented spears of greater center of gravity to butt end length will bridge the gap and continue on conveyor belt 92 to the next gap.

The tip-first oriented spear 116 of FIG. 5 advances from the end of roller 94 across the gap. Since the center of gravity to tip end length of this spear is greater than gap length 80 the spear will bridge the gap in the position at 116 above roller 88. As the butt-end of this spear moves from small diameter roller 94 it will drip to the position at 116b and tilt backward by gravital action since its center of gravity to butt end length is less than gap length 80. Continued tilting of the spear moves it successively to positions 116c and 116d where it moves onto chute 96 in butt-first orientation. Those tip-first spears of greater length will not tilt backwards sufficiently to drop through the gap and are advanced on belt 92 to the succeeding gaps.

FIG. 6 illustrates generally at 118 the shaker-feeder apparatus for metering articles in a controlled feed for discharge in single file in multiple lanes to, the orienting and grading apparatus described herein. Shaker-feeder 118 receives randomly oriented articles, such as the exemplary asparagus spears, and delivers them onto the lanes in single file, evenly spaced distribution with a substantially even rate of feed, or singulation, between the lanes to achieve optimum line capacity and increases overall operating efficiency.

Shaker-feeder 118 comprises a shaped bed member 120, which may be of sheet-metal construction, having an integral upwardly opening V-shaped in-feed section 122, a pair of downwardly inclined diverging V-shaped distributor troughs or channels 124,126 and a series of parallel V-shaped feeder lanes 128–138.

As illustrated in FIG. 7, bed member 120 is supported by a frame 140 mounted by suitable means such as resilient mountings 142,144 for vibrating or oscillating motion through eccentric drive means 148.

Each of the feeder lanes 128-138 are formed with an upwardly opening V-shaped cross-sectional configuration effective to catch individual spears cascading down troughs 124,126 and direct them in single file order onto the lanes of the orientor. The exemplary feeder lane 136 includes an upper or article receiving V-shaped portion 150 on the inner side of trough 126 and a lower downwardly inclined V-shaped discharging portion 152 disposed on an inclined flat surface of the bed member and terminating the discharge end 70 above a relatively narrow lane 156 of the orientor 157. A plurality of openings 158, 160 are provided between the spaced apart lane ends. Overflow spears which cascade down the flat surface bed member without feeding into any of the lanes fall through openings 158, 160 onto a collector chute 161 which directs the overflow onto cross-conveyor belt 162 for collection and subsequent recycling, as desired. Similarly, the lower ends of distributor troughs, 124,126 discharge excess spears onto collector chute 161 and conveyor 162 for recycling.

Under-length articles and broken short articles drop out at the gap between the lane ends 70 and the first roller of orientor 157. The gap can be adjusted to drop out the minimum size desired. Conveyor 162 takes away the under-length articles.

In operation, bed member 120 is vibrated through operation of eccentric drive 148 and spears are loaded on the in-feed trough 122. The vibrating or shaking action causes the spears to progress down the inclined distributor troughs 124,126 whereby they are caused to engage portions upper 150 of the parallel V-shaped feeder lanes, with some of the spears being diverted into the lanes. The spears cascade from one lane to the next until all lanes are filled, with the excess dropping from the lanes onto chute 161 and overflow conveyor 162. Continued shaking of bed member 120 advances the spears in the individual lanes down the incline of the bed for discharge in single file order onto the multiple lanes of an orientor. Overflow spears which advance down the bed between the lanes will fall through the openings 158,160 onto overflow conveyor 162 for recycling. Supply an excess of spears in this manner insures that all lanes are properly filled for maximum operating efficiency. This reduces the possibility of gaps occurring in the feeding of articles onto the lanes of the orientor.

From the foregoing it is apparent that there has been provided a new and improved method and apparatus for supplying elongated articles in a plurality of lanes in single file order, thus permitting maximum operating efficiency or an orientor to which the articles are supplied.

I claim:

1. In a method for distributing a plurality of randomly oriented elongated articles in single file order into multiple, substantially parallel juxtaposed lanes associated in article receiving relationship with a plurality of substantially parallel feeder lanes each having serially connected article receiving and discharging portions, the steps of moving the articles downwardly along at least one inclined path traversing across the receiving portions of the feeder lanes thereby filling the receiving portions of the feeder lanes with articles disposed lengthwise of said lanes, the articles being caused to cascade down said path from the receiving portions of one feeder lane to the receiving portion of the next lane, removing articles in excess of that required to fill the feeder lanes, and causing the articles in the feeder lanes to progress along and be discharged from the same into said first named multiple lanes.

2. The method of claim 1, including the steps of collecting together the excess articles not filling the feeder lanes, segregating the collected excess articles from the articles discharged to the multiple lanes, and moving the segregated articles from the multiple lanes for recycle to said path.

3. The method of claim 1, in which the articles are moved along the path and the feeder lanes by vibration thereof.

4. Apparatus for distributing a plurality of randomly lengthwise oriented elongated articles into multiple, substantially parallel juxtaposed lanes, including the combination of an infeed trough to receive articles to be distributed, a pair of distributor troughs leading from said infeed trough in respective paths diverging apart in the direction of article movement therethrough, a plurality of substantially parallel trough-like feeder lanes disposed between the paths of said distributor troughs, each feeder lane having an upper article receiving portion disposed in one of said distributor troughs and a lower portion extending downwardly from said one trough to a discharge end, each of said feeder lane discharge ends discharging the articles into a respective one of said first mentioned multiple lanes, and means to advance the articles from the infeed trough into the distributor troughs and along the paths of said distributor troughs whereby the articles cascade from one lane receiving portion to the next to fill the same.

5. Apparatus as in claim 23 in which said means to advance the articles includes means to impart vibratory movement to the trough and feeder lanes.

6. Apparatus for distributing a plurality of randomly lengthwise oriented elongated articles into multiple, substantially parallel juxtaposed lanes, including the combination of a distributor trough for receiving the randomly oriented articles, the distributor trough being inclined downwardly in the direction of article movement therethrough, a plurality of substantially parallel trough-like feeder lanes each having an upper article receiving portion disposed in a portion of the distributor trough and extending across said direction of article movement to receive articles aligned lengthwise in the direction of article movement along the feeder lane and a lower portion extending downwardly from the trough to a discharge end, each of said feeder lane discharge ends discharging the articles into a respective one of the multiple lanes, and means to impart vibratory movement to said trough and feeder lanes to advance the articles along the length of the trough whereby the articles cascade from one lane receiving portion to the next to fill the same.

7. Apparatus for distributing a plurality of randomly lengthwise oriented elongated articles into multiple, substantially parallel juxtaposed lanes, including the combination of a distributor trough for receiving the randomly oriented articles, a plurality of substantially parallel trough-like feeder lanes each having an upper article receiving receiving portion disposed in the distributor trough to receive articles aligned lengthwise in the direction of article movement along the feeder lane and a lower portion extending downwardly from the trough to a discharge end, said distributor trough being inclined downwardly for filling the upper portions of the feeder lanes and for cascading excess articles downwardly, each of said feeder lane discharge ends discharging the articles into a respective one of the multiple lanes, means to vibrate the trough and feeder lanes to advance the articles along the length of the trough whereby the articles cascade from one lane receiving portion to the next to fill the same, and means collecting excess articles cascading over the last feeder lane positioned downstream in the distributor trough.

8. Apparatus for distributing a plurality of randomly lengthwise oriented elongated articles into multiple, substantially parallel juxtaposed lanes, including the combination of a distributor trough for receiving the randomly oriented articles, said distributor trough defining a substantially V-shaped upwardly opening configuration in cross-section and inclined downwardly for moving the articles therethrough, a plurality of substantially parallel trough-like feeder lanes each having an upper article receiving portion disposed in the distributor trough and extending transversely across the trough to receive articles aligned lengthwise in the direction of article movement along the feeder lane whereby articles moving down the trough are fed into certain of the lanes with excess articles cascading to a next succeeding lane, the feeder lanes each having a lower portion extending downwardly from the trough to a discharge end, each of said feeder lane discharge ends discharging the articles into a respective one of the multiple lanes, and means to advance the articles along the length of the trough whereby the articles cascade from one lane receiving portion to the next to fill the same.

9. Apparatus for distributing a plurality of randomly lengthwise oriented elongated articles into multiple, substantially parallel juxtaposed lanes, including the combination of a distributor trough for receiving the randomly oriented articles, a plurality of substantially parallel trough-like feeder lanes each having an upper article receiving portion disposed in the distributor trough to receive articles aligned lengthwise in the direction of article movement along the feeder lane and a lower portion extending downwardly from the trough to a discharge end, the discharge end of each feeder lane discharging the articles into a respective one of the multiple lanes, means to vibrate the trough and feeder lanes to advance the articles along the length of the trough whereby the articles cascade from the article receiving portion of one lane to the next to fill the same, said feeder lane lower portions being spaced apart at their discharge ends to define overflow openings to receive excess articles not filling the feeder lanes, and means conveying the excess articles moving through said openings for recycle to the distributor trough.

* * * * *